United States Patent
McKoskey

(10) Patent No.: US 10,247,148 B2
(45) Date of Patent: Apr. 2, 2019

(54) SUPPLEMENTARY AIR ASSEMBLY FOR AN ENGINE

(71) Applicant: Polaris Industries Inc., Medina, MN (US)

(72) Inventor: G. Jay McKoskey, Forest Lake, MN (US)

(73) Assignee: Polaris Industries Inc., Medina, MN (US)

( * ) Notice: Subject to any disclaimer, the term of this patent is extended or adjusted under 35 U.S.C. 154(b) by 80 days.

(21) Appl. No.: 15/062,898

(22) Filed: Mar. 7, 2016

(65) Prior Publication Data

US 2016/0258393 A1    Sep. 8, 2016

Related U.S. Application Data

(60) Provisional application No. 62/129,183, filed on Mar. 6, 2015.

(51) Int. Cl.
*F02M 35/00* (2006.01)
*F02M 35/10* (2006.01)
(Continued)

(52) U.S. Cl.
CPC ..... *F02M 35/10006* (2013.01); *F02B 27/006* (2013.01); *F02D 9/02* (2013.01);
(Continued)

(58) Field of Classification Search
CPC ....... F02M 35/10006; F02M 35/10308; F02M 35/1045; F02M 35/10275;
(Continued)

(56) References Cited

U.S. PATENT DOCUMENTS 3,437,320 A * 4/1969 Brooks ................ F02M 3/08
  261/41.5
3,505,983 A * 4/1970 Gunter ............. F02M 35/10183
  123/184.39
(Continued)

FOREIGN PATENT DOCUMENTS

DE      29811432     9/1998
GB      2087480      5/1982
(Continued)

OTHER PUBLICATIONS

International Search Report and Written Opinion issued by the International Searching Authority, dated Jun. 2, 2016, in related International Patent Application No. PCT/US2016/020357; 15 pages.
(Continued)

*Primary Examiner* — Hieu T Vo
*Assistant Examiner* — Sherman Manley
(74) *Attorney, Agent, or Firm* — Faegre Baker Daniels LLP

(57) ABSTRACT

An internal combustion engine includes a crankcase including a crankshaft and at least one cylinder coupled to the crankcase. The at least one cylinder has an intake port and defines an internal combustion chamber. The engine further includes a throttle body assembly with a throttle valve coupled to the intake port of the at least one cylinder and a throttle plate. Additionally, the engine includes a supplementary air inlet fluidly coupled to the intake port and spaced apart from the throttle valve. The supplementary air inlet is configured to receive a flow of air from a location downstream of the throttle plate when the throttle plate is in a fully closed position and the flow of air is directed into the combustion chamber through the intake port for combustion therein.

31 Claims, 9 Drawing Sheets

(51) Int. Cl.
*F02D 9/02* (2006.01)
*F02M 35/104* (2006.01)
*F02D 9/10* (2006.01)
*F02B 27/00* (2006.01)
*F02M 35/108* (2006.01)
*F02M 35/116* (2006.01)
*F02B 31/08* (2006.01)
*F02B 31/00* (2006.01)

(52) U.S. Cl.
CPC ......... *F02D 9/109* (2013.01); *F02D 9/1055* (2013.01); *F02M 35/1045* (2013.01); *F02M 35/10072* (2013.01); *F02M 35/10131* (2013.01); *F02M 35/10255* (2013.01); *F02M 35/10275* (2013.01); *F02M 35/10308* (2013.01); *F02B 31/085* (2013.01); *F02B 2031/003* (2013.01); *F02D 2009/0213* (2013.01); *F02M 35/1085* (2013.01); *F02M 35/116* (2013.01); *Y02T 10/146* (2013.01)

(58) Field of Classification Search
CPC ....... F02M 35/10131; F02M 35/10072; F02M 35/10255; F02M 35/116; F02M 35/1085; F02D 9/1055; F02D 9/109; F02D 9/02; F02D 2009/0213; F02B 27/006; F02B 31/085; F02B 2031/003; Y02T 10/146
See application file for complete search history.

(56) References Cited

U.S. PATENT DOCUMENTS

| | | | | |
|---|---|---|---|---|
| 3,664,316 A * | 5/1972 | Garcea | .................. | F02B 27/00 |
| | | | | 123/184.38 |
| 3,977,366 A * | 8/1976 | Yamaguchi | .......... | F02M 13/046 |
| | | | | 123/3 |
| 4,214,561 A * | 7/1980 | Matsumoto | ............. | F02B 31/08 |
| | | | | 123/432 |
| 4,231,329 A * | 11/1980 | Ishida | .................... | F02M 29/00 |
| | | | | 123/184.46 |
| 4,253,432 A * | 3/1981 | Nohira | .................... | F02B 31/08 |
| | | | | 123/184.45 |
| 4,262,639 A * | 4/1981 | Motosugi | ................ | F02B 31/08 |
| | | | | 123/184.45 |
| 4,483,282 A * | 11/1984 | Sakaoka | .................. | F02B 27/00 |
| | | | | 123/184.52 |
| 4,516,544 A * | 5/1985 | Okumura | .............. | F02F 1/4228 |
| | | | | 123/188.14 |
| 4,867,109 A * | 9/1989 | Tezuka | .................... | F02B 31/08 |
| | | | | 123/184.38 |
| 4,934,331 A * | 6/1990 | Pommer | .............. | F02M 23/003 |
| | | | | 123/587 |
| 5,005,535 A * | 4/1991 | Binversie | ............... | F02M 35/10 |
| | | | | 123/184.39 |
| 5,014,654 A * | 5/1991 | Ishibashi | .......... | F02M 35/10222 |
| | | | | 123/184.38 |
| 5,022,355 A * | 6/1991 | Billingsley | ............ | F02M 35/10 |
| | | | | 123/184.39 |
| 5,035,211 A * | 7/1991 | Mate | ...................... | F02M 35/10 |
| | | | | 123/184.31 |
| 5,209,209 A * | 5/1993 | Karlsson | .............. | F02M 23/001 |
| | | | | 123/568.17 |
| 5,261,231 A * | 11/1993 | Huh | ....................... | F02B 21/00 |
| | | | | 123/184.53 |
| 5,377,650 A * | 1/1995 | Warner | ..................... | F01N 3/22 |
| | | | | 123/568.29 |
| 6,910,546 B2 * | 6/2005 | Tsutsumi | ................ | F02B 75/22 |
| | | | | 180/219 |
| 2004/0144375 A1 * | 7/2004 | Hunter | ................... | F02M 25/06 |
| | | | | 123/572 |
| 2008/0053391 A1 * | 3/2008 | Hayashi | ................. | F02B 27/02 |
| | | | | 123/184.21 |

FOREIGN PATENT DOCUMENTS

| | | |
|---|---|---|
| JP | S54103913 | 8/1979 |
| JP | S55-083528 | 6/1980 |
| JP | S61-034317 | 2/1986 |
| JP | H0216329 | 1/1990 |
| JP | H02-144623 | 6/1990 |
| JP | H06-093866 | 4/1994 |
| JP | 2010-116870 | 5/2010 |

OTHER PUBLICATIONS

Examination Report No. 1 issued by the Australian Government IP Australia, dated Oct. 8, 2018 for Australian Patent Application No. 2016229289; 5 pages.
English Translation of Office Action issued by the Japanese Patent Office, dated Dec. 5, 2018, for Japanese Patent Application No. 2017-546207; 12 pages.
Office Action issued by the Japanese Patent Office, dated Dec. 5, 2018, for Japanese Patent Application No. 2017-546207; 9 pages.

* cited by examiner

US 10,247,148 B2

SUPPLEMENTARY AIR ASSEMBLY FOR AN ENGINE

REFERENCE TO RELATED APPLICATIONS

The present application claims priority from U.S. Provisional patent application Ser. No. 62/129,183 filed Mar. 6, 2015, the subject matter of which is incorporated herein by reference.

BACKGROUND OF THE DISCLOSURE

The present disclosure relates to a throttling mechanism for an engine and, more particularly, to a supplementary air throttling feature for supplying air to a supplementary intake air circuit of an internal combustion engine.

To increase the efficiency of an engine, for example, when the engine is operating at low load or idle, faster combustion burn rates may be achieved by increasing turbulence in the combustion air entering the combustion chamber. By increasing the turbulence of the combustion air, better fuel-air mixing may occur.

For example, as shown in FIG. 3, an internal combustion engine 1000 includes at least one cylinder 60 with a combustion chamber 100 therein, an air inlet 120, and at least one intake port 140. A throttle body assembly 200 has a body portion 240 and a throttle plate 260, and a supplementary air assembly 400 includes a supplementary air inlet or port 420 and an air tube 440 for introducing a swirl into the combustion air to increase turbulence when engine 1000 is operating at low load or idle conditions. An idle air control valve 500 may also be provided to control throttle at supplementary air inlet 420. More particularly, in some embodiments, a flow of air travels through air tube 440 and air inlet 420 and into the intake port 140 of engine 1000. This air flow is not modulated by the throttle of engine 1000, but rather, by the separate idle air control valve 500. An engine control unit may be electrically coupled to idle air control valve 500 to control idle air control valve 500 based on predetermined parameters and/or conditions of engine 1000 during operation.

SUMMARY OF THE DISCLOSURE

In an exemplary embodiment of the present invention, an internal combustion engine includes a crankcase including a crankshaft and at least one cylinder coupled to the crankcase. The at least one cylinder has an intake port and defines an internal combustion chamber. The engine further includes a throttle body assembly with a throttle valve coupled to an air inlet of the at least one cylinder and a throttle plate. Additionally, the engine includes a supplementary air inlet fluidly coupled to the intake port and spaced apart from the throttle valve. The supplementary air inlet is configured to receive a flow of air from a location downstream of the throttle plate when the throttle plate is in a fully closed position and the flow of air is directed into the combustion chamber through the intake port for combustion therein.

In another embodiment, an internal combustion engine, comprising a crankcase including a crankshaft; at least one cylinder coupled to the crankcase and having an intake port and the at least one cylinder defining an internal combustion chamber; a throttle body assembly having a throttle valve coupled to an air inlet of the at least one cylinder and including a throttle plate; a supplementary air inlet fluidly coupled to the intake port, wherein the supplementary air inlet is configured to receive a flow of air from a location downstream of the throttle plate of the at least one cylinder, and the flow of air is directed into the intake port of the at least one cylinder for combustion within the combustion chamber.

In a further exemplary embodiment of the present invention, an internal combustion engine includes a crankcase including a crankshaft and at least one cylinder coupled to the crankcase. The at least one cylinder defines an internal combustion chamber. The engine further includes a throttle body assembly with an inlet and an outlet fluidly coupled to an air inlet of the at least one cylinder. The throttle body assembly also includes a body portion and a throttle plate movably coupled within the body portion. The body portion includes a plurality of apertures. The engine also includes a supplementary air inlet fluidly coupled to the intake port and configured to receive air through at least one of the plurality of apertures of the body portion of the throttle body.

In another exemplary embodiment of the present invention, a throttle body assembly for use with an engine includes a throttle port configured to fluidly couple with an air intake of the engine and has a body portion including a plurality of apertures. The throttle body assembly also includes a throttle plate movably coupled within the body portion and an outlet port coupled to the body portion and positioned adjacent the plurality of apertures.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

Corresponding reference characters indicate corresponding parts throughout the several views. Unless stated otherwise the drawings are proportional.

DETAILED DESCRIPTION

The embodiments disclosed below are not intended to be exhaustive or to limit the invention to the precise forms disclosed in the following detailed description. Rather, the embodiments are chosen and described so that others skilled in the art may utilize their teachings. It should be understood that the invention may have application to various types of engine-driven equipment, such as, but not limited to generators, construction equipment, utility equipment, all-terrain vehicles, motorcycles, watercraft, utility vehicles, scooters, golf carts, automobiles, aircraft, and mopeds, or any other device or vehicle with a spark-ignited, four-stroke engine.

Figure 1:
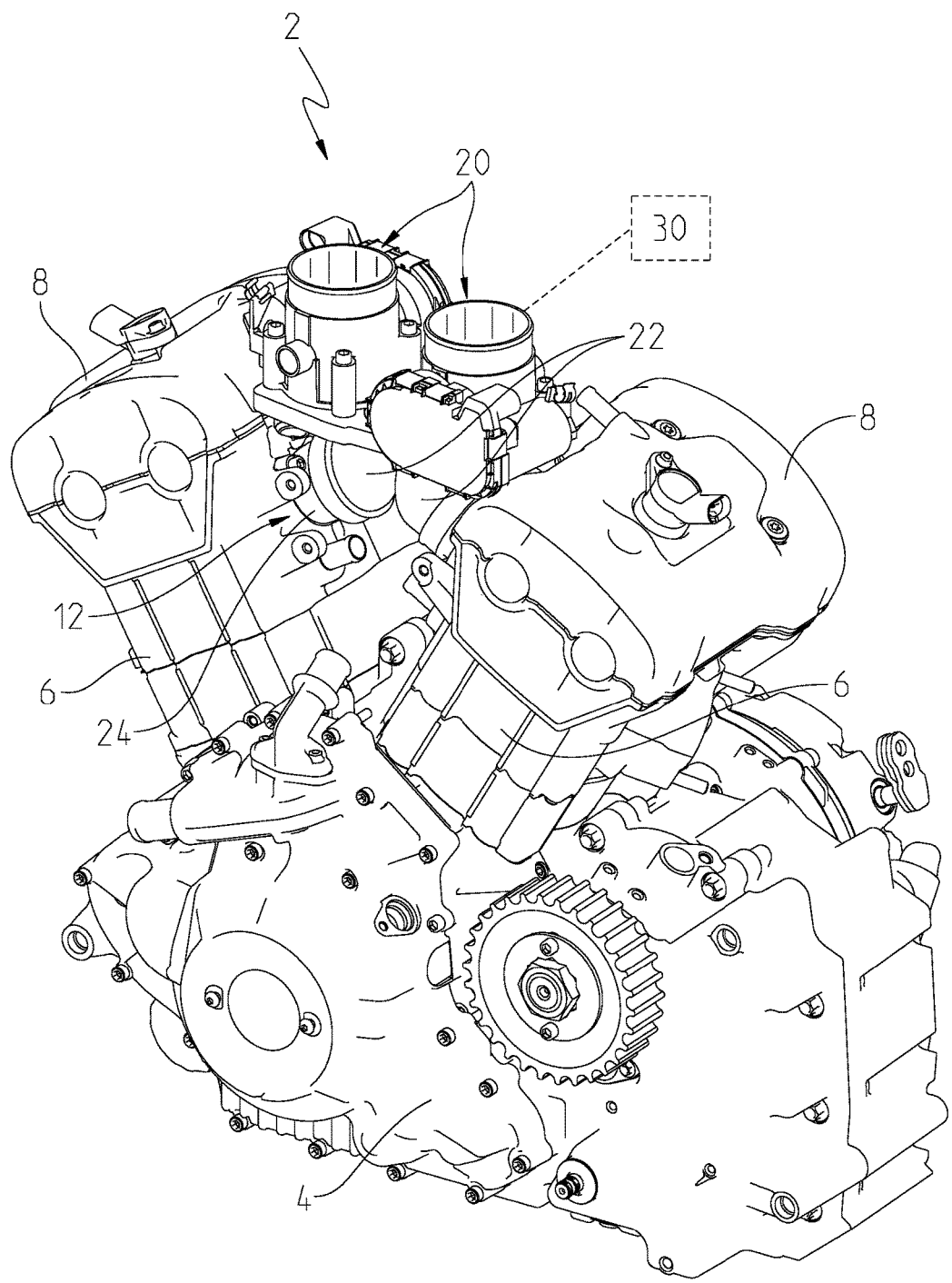
FIG. 1 is a perspective view of an illustrative two-cylinder internal combustion engine.
Figure 2:
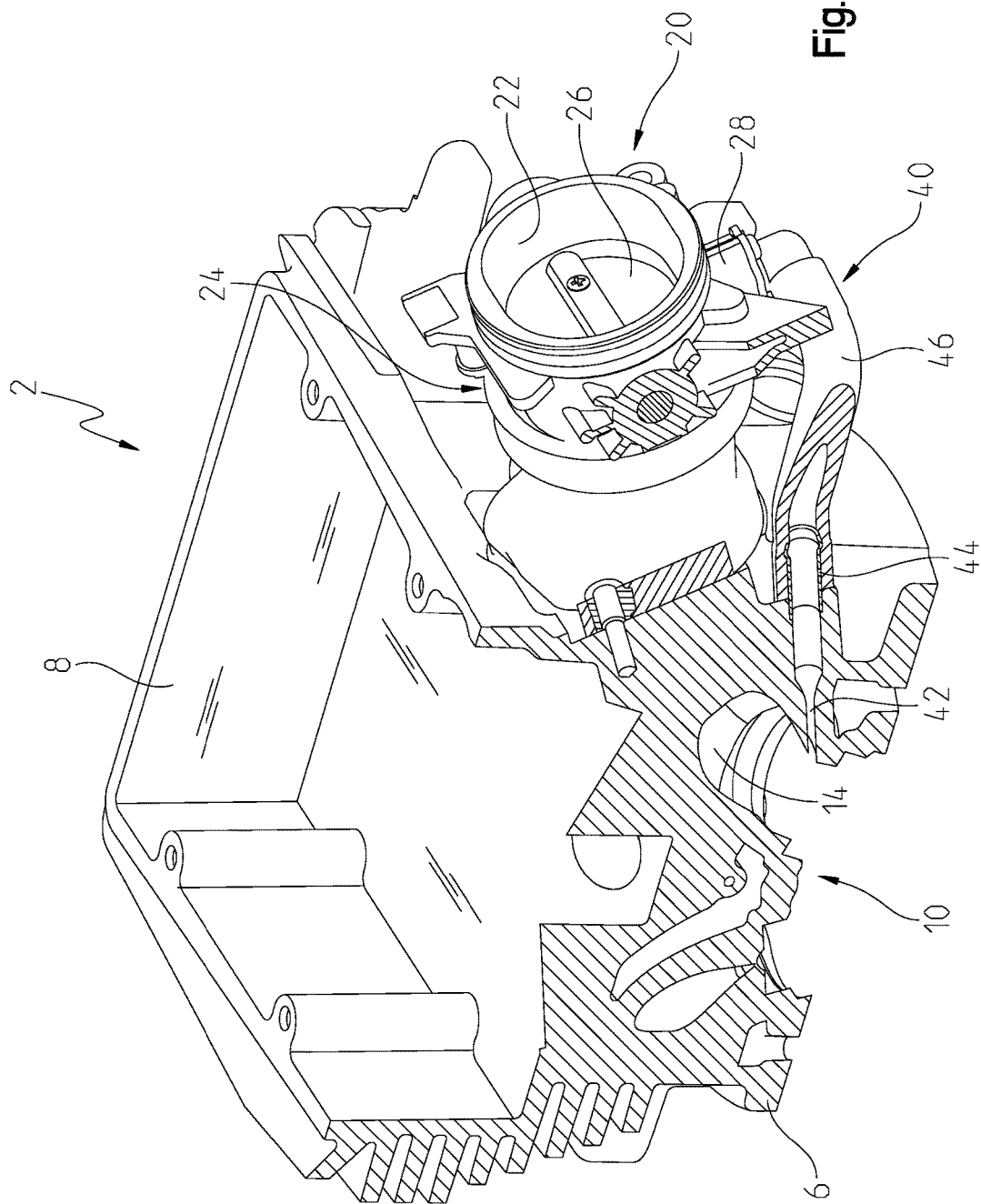
FIG. 2 is a cross-sectional view of a cylinder head of one of the cylinders coupled to a throttle valve of a throttle body assembly of the engine of FIG. 1.

An illustrative embodiment of an internal combustion engine 2 is shown in FIG. 1. Engine 2 includes a crankcase 4 and at least one cylinder 6. Illustratively, engine 2 includes two cylinders 6 in a V-shaped configuration, however, engine 2 may include any number of cylinder(s) 6 in any configuration possible for cylinder 6. Each cylinder 6 includes a cylinder head 8 defining a top end of each cylinder 6. An internal combustion chamber 10 (FIG. 4A) is defined within each cylinder 6 and is configured for combustion therein during operation of engine 2.

Referring to FIGS. 1, 2, 4A, and 4B, each cylinder 6 also includes an air inlet 12 for supplying air to combustion chamber 10 for combustion. Engine 2 also includes at least one intake port 14 and an exhaust port (not shown). Air inlet 12 and intake port 14 facilitate combustion with combustion chamber 10.

Additionally, as shown in FIG. 1, a throttle body assembly 20 is coupled to engine 2 which includes a plurality of throttle valves 22 which are each fluidly coupled to the air inlet 12 of each cylinder 6. Throttle valve 22 includes a body portion 24 and a throttle plate 26 movably coupled within body portion 24. Body portion 24 includes a top wall 24a, a bottom wall 24b, a first side wall 24c, and a second side wall 24d. Illustrative throttle body assembly 20 may be electronically controlled by an engine control unit ("ECU") 30 to control operation of throttle body assembly 20, including movement of throttle plate 26. In one embodiment, throttle plate 26 is configured to rotatably move between at least positions A, B, C, D, and any position therebetween (FIG. 6).

Figure 4A:
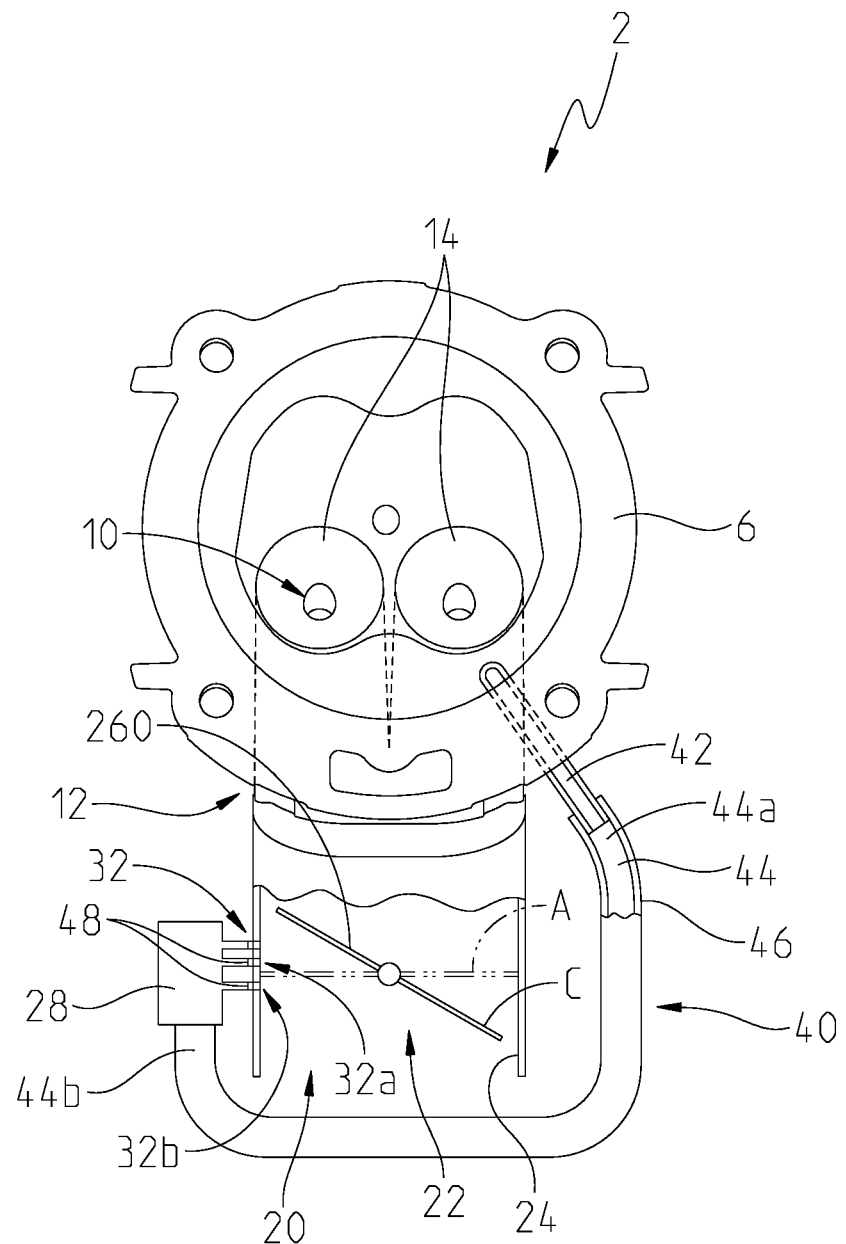
FIG. 4A is a schematic view of one cylinder of an engine of the present disclosure, including a first embodiment of a supplementary air assembly which includes a supplementary air inlet fluidly coupled to the throttle valve of the throttle body through a supplementary tube.
Figure 4B:
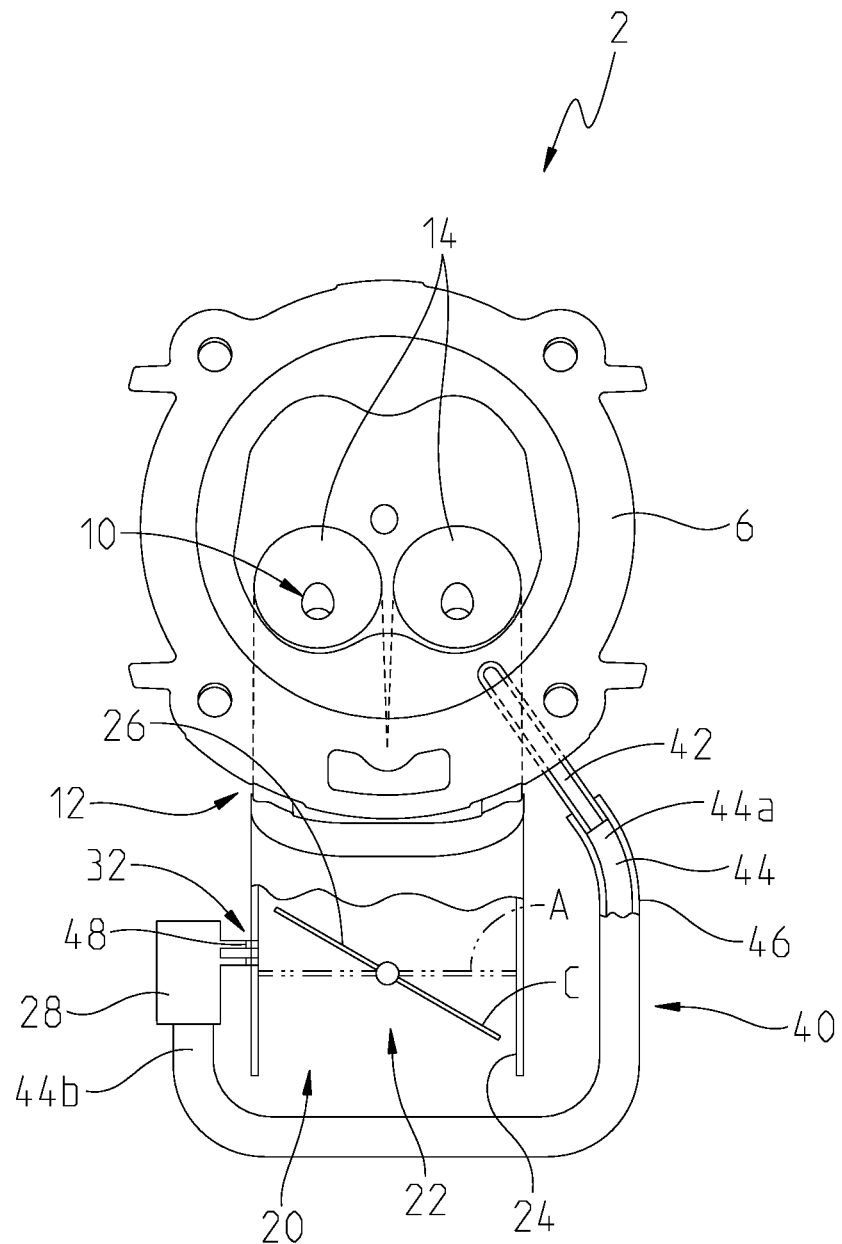
FIG. 4B is a schematic view of one cylinder of an engine of the present disclosure, including an alternative embodiment of the supplementary air assembly of FIG. 4A which includes a supplementary air inlet fluidly coupled to the throttle valve through a tube.
Figure 5A:
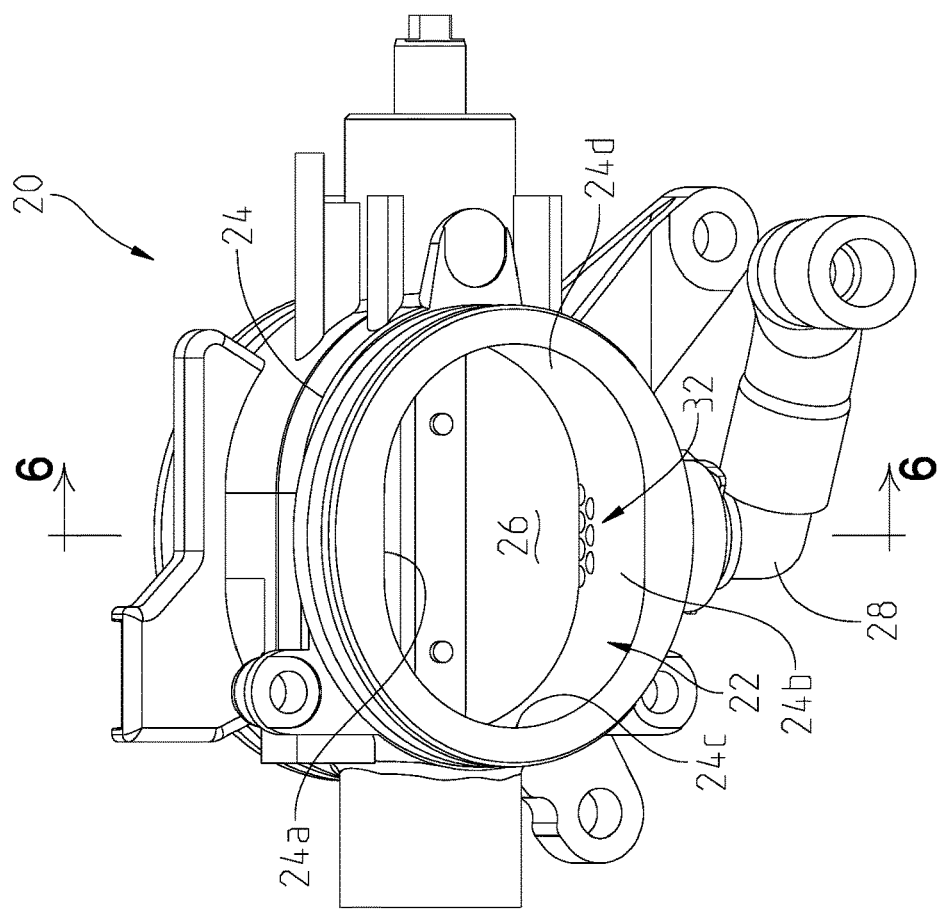
FIG. 5A is a perspective view of the throttle body of FIGS. 4A or 4B having a throttle plate and a plurality of apertures extending through a wall of the throttle valve.
Figure 6:
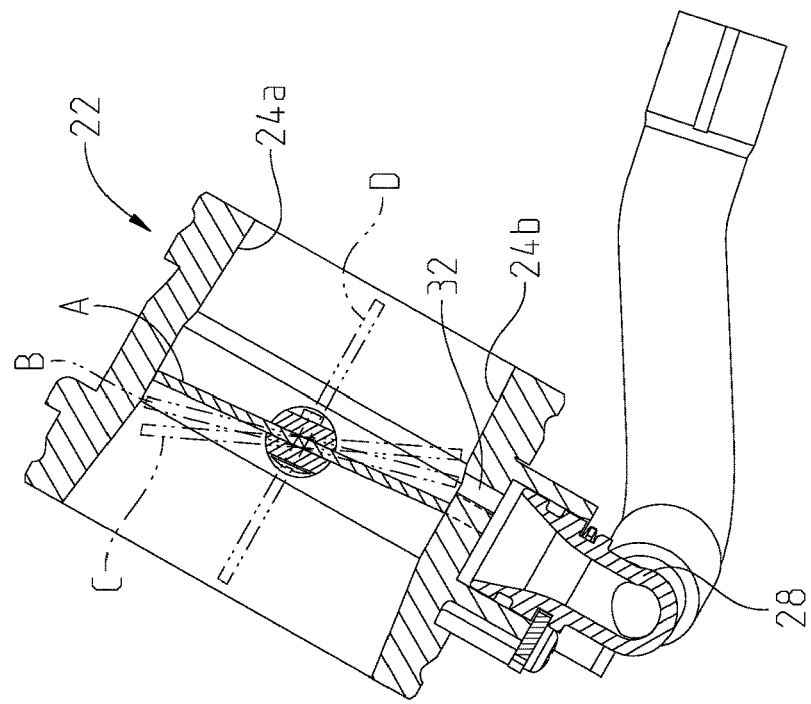
FIG. 6 is a cross-sectional view of the throttle valve of FIG. 5A, taken along line 6-6 of FIG. 5A.
Figure 5B:
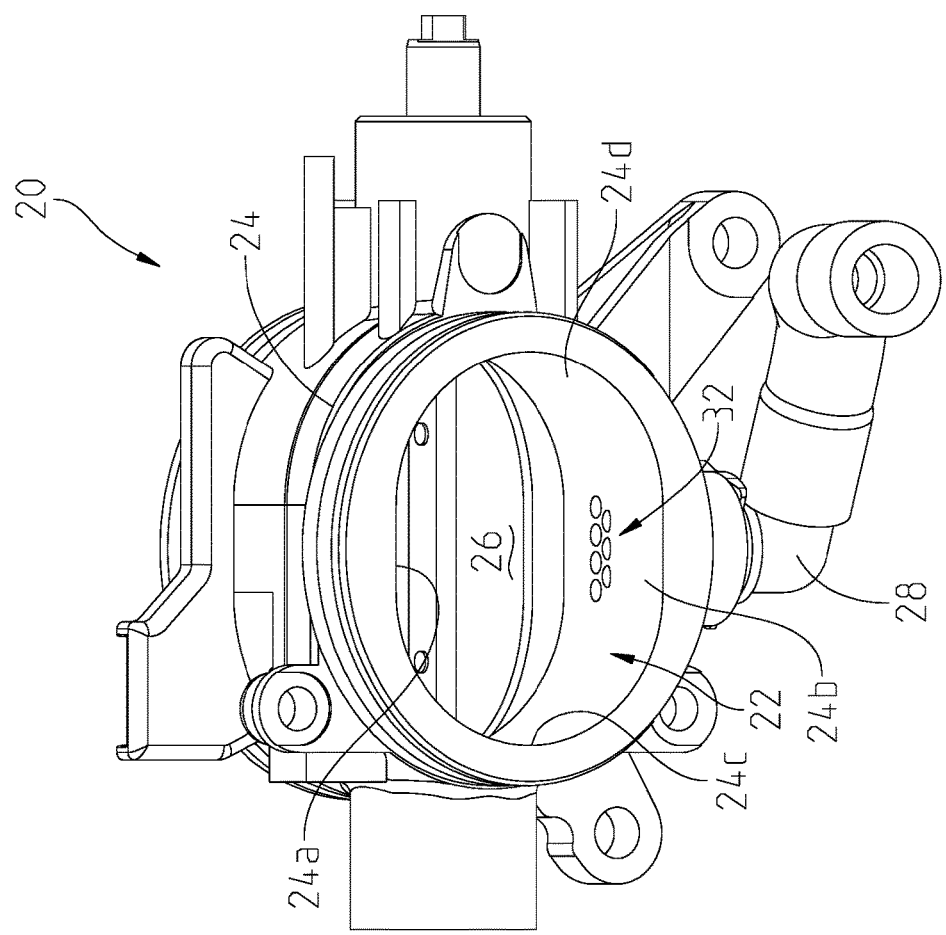
FIG. 5B is a further perspective view of the throttle body of FIGS. 4A or 4B shown in the open position and exposing the plurality of apertures.

In one embodiment, throttle body assembly 20 also includes an outlet 28 coupled to body portion 24, as shown in FIGS. 4A-6. Additionally, body portion 24 of throttle body assembly 20 includes a plurality of apertures 32 which are arranged in a staggered orientation. Illustratively, apertures 32 extend through bottom wall 24b of body portion 24, however, apertures 32 may extend through any of walls 24a, 24b, 24c, 24d. In the embodiment of FIG. 4A, at least one aperture 32a is positioned downstream of throttle plate 26 and at least one aperture 32b is positioned upstream of throttle plate 26 when throttle plate 26 is in a fully closed position A (FIG. 6). Conversely, in the embodiment of FIG. 4B, each aperture 32 is positioned downstream of throttle plate 26 when throttle plate 26 is in the fully closed position A (FIG. 6). Outlet 28 is positioned adjacent apertures 32 such that when a portion of air at air inlet 12 of engine 2 is received through apertures 32, that portion of air flows into outlet 28.

Referring still to FIGS. 4A-6, an auxiliary or supplementary air circuit or assembly 40 is fluidly coupled to throttle body assembly 20 and intake port 14 of engine 2. Supplementary air assembly 40 includes a supplementary air inlet 42 and a supplementary air tube or hose 44. Supplementary air inlet 42 is fluidly coupled to cylinder 6 of engine 2 and, more particularly, is fluidly coupled to intake port 14 to provide air to combustion chamber 10 via intake port 14 for combustion at low load, idle conditions, or at other operating conditions of engine 2. More particularly, when engine 2 operates at low load or idle, throttle plate 26 may be nearly closed (e.g., throttle plate 26 may be positioned in a first intermediate position B (FIG. 6)) because there is no input to the throttle. However, air is still needed within combustion chamber 10 to maintain operation of engine 2 even at idle, low load, or other conditions of engine 2.

As shown in FIGS. 4A-6, illustrative supplementary air tube 44 has a first end 44a coupled to supplementary air inlet 42 and a second end 44b coupled to outlet 28. In one embodiment, supplementary air tube 44 is positioned within an outer sleeve 46. Supplementary air tube 44 is configured to receive a flow of air at air inlet 12 which flows through supplementary air inlet 42, into intake port 14, and then into the combustion chamber 10 for combustion therein. When the air flows through supplementary air tube 44 and into supplementary air inlet 42, the turbulence of the air increases, which may increase the combustion rate within combustion chamber 10.

Referring to FIG. 6, in operation, when engine 2 is not operating, throttle valve 22 is closed and throttle plate 26 is positioned in the fully closed position A. Illustratively, when in the fully closed position A, throttle plate 26 extends between top and bottom walls 24a, 24b of body portion 24, and may be in contact with or sealed against walls 24, to block air flow into air inlet 12. As such, when throttle plate 26 is in the fully closed position A, air flow is not received within combustion chamber 10 or through apertures 32, which are positioned downstream of throttle plate 26 in the fully closed position A, such that the position and movement of throttle plate 26 controls the air flow to apertures 32. However, when engine 2 is operating, air enters combustion chamber 10 for combustion therein. More particularly, ECU 30 electronically controls operation of throttle body assembly 20 based on throttle conditions of engine 2 and/or other operating parameters of engine 2. For example, when a large throttle input occurs, ECU 30 transmits a signal to throttle body assembly 20 and throttle plate 26 is moved to the fully open position D. When throttle plate 26 is in the fully open position D, air flows through throttle valve 22, into air inlet 12, and into combustion chamber 10 for combustion therein. In the open positioned, throttle plate 26 is generally parallel to top and bottom walls 24a, 24b and extends in the same direction as the flow path of air into combustion chamber 10.

However, when engine 2 is operating but the throttle input does not require opening throttle valve 22 to the fully open position D, for example when engine 2 is operating at low loads or at idle, ECU 30 transmits a signal to throttle body assembly 20 and throttle plate 26 may be opened to a first intermediate position B, a second intermediate position C, or any position between fully closed position A and fully open position D. As such, when throttle plate 26 is at least partially opened, at least one aperture 32 is now upstream of throttle plate 26 and may be exposed and a portion of air in throttle valve 22 flows through the exposed aperture(s) 32.

The position of throttle plate 26 may affect which apertures 32 receive air and/or the quantity of air received through apertures 32 such that the position of throttle plate 26 modulates and controls air flow through supplementary air assembly 40. The portion of air received through the exposed, upstream aperture(s) 32 then flows through outlet 28, into supplementary air tube 44, through supplementary air inlet 42, into intake port 14, and then into combustion chamber 10. In this way, combustion still occurs in combustion chamber 10 even when engine 2 is at a low loads or at idle and the flow of air through apertures 32 is controlled and modulated by the position of throttle plate 26 and operation of throttle body assembly 20. Furthermore, in the embodiment of FIG. 4A, even when throttle plate 26 is in the fully closed position A, air in throttle valve 22 may flow through aperture 32b, which is upstream of throttle plate 26, and through supplementary air tube 44 for combustion in combustion chamber 10.

When air is in throttle valve 22, air flows toward combustion chamber 10. However, to prevent air from flowing in the opposite direction within supplementary air tube 44 (i.e., towards throttle valve 22), a one-way valve 48 (FIG. 4A), for example a reed valve, may be positioned adjacent apertures 32 to control the direction of air flow within supplementary air tube 44. More particularly, one-way valve 48 allows the flow of air in one direction toward supplementary air tube 44 but inhibits air flow in the opposite direction toward throttle valve 22.

Figure 3:
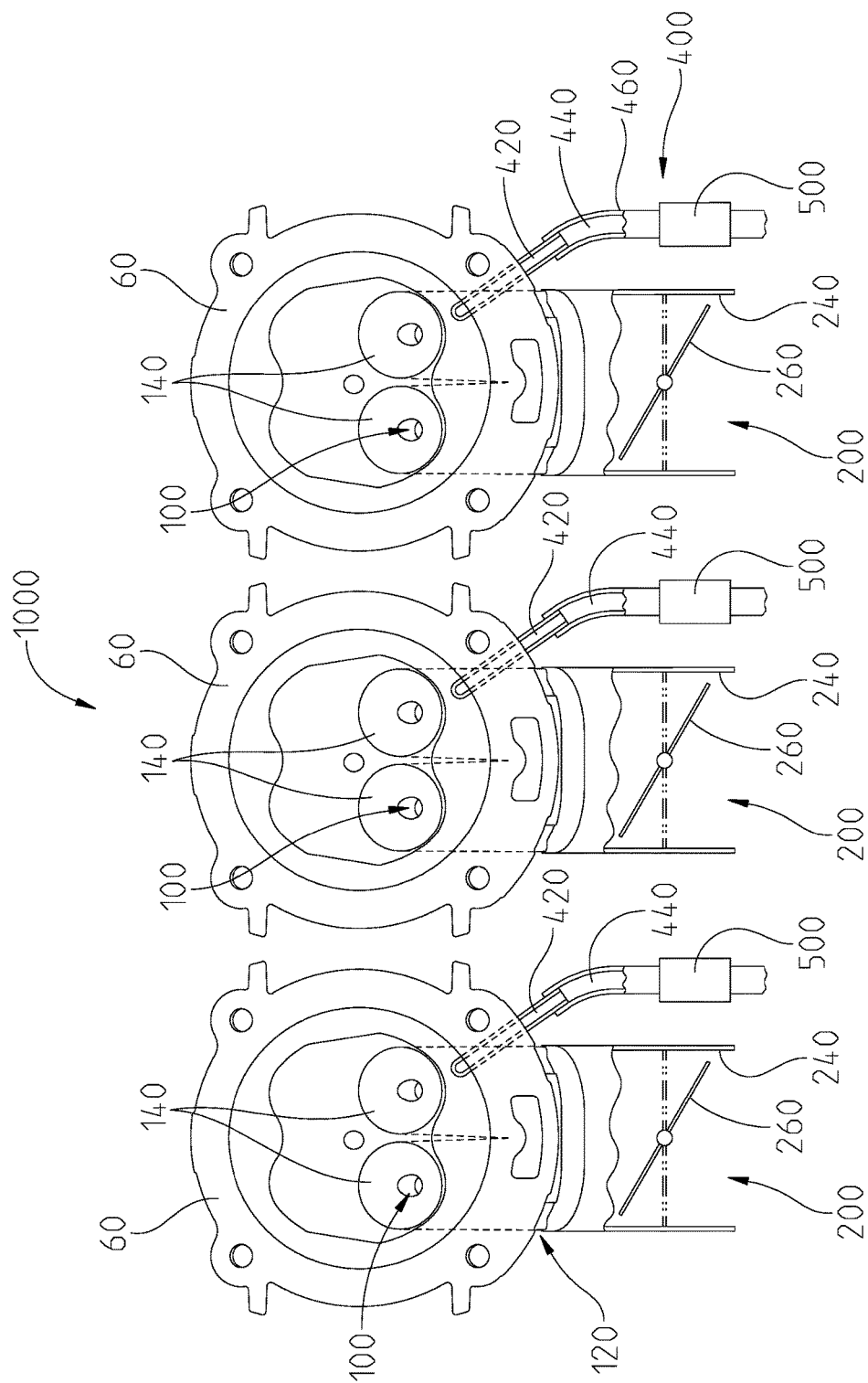
FIG. 3 is a schematic view of three cylinders of an internal combustion engine each having a prior art air assembly with an idle air control valve.

It should be understood that the embodiments of FIGS. 4A-6 do not require the use of an air control valve 500 (FIG. 3) because operation of supplementary air assembly 40 is controlled by throttle body assembly 20 of engine 2. As such, no additional valve or throttling mechanism is required to control the supplementary air entering intake port 14 and combustion chamber 10 because supplementary air assembly 40 is controlled and modulated by throttle body assembly 20.

Figure 7:
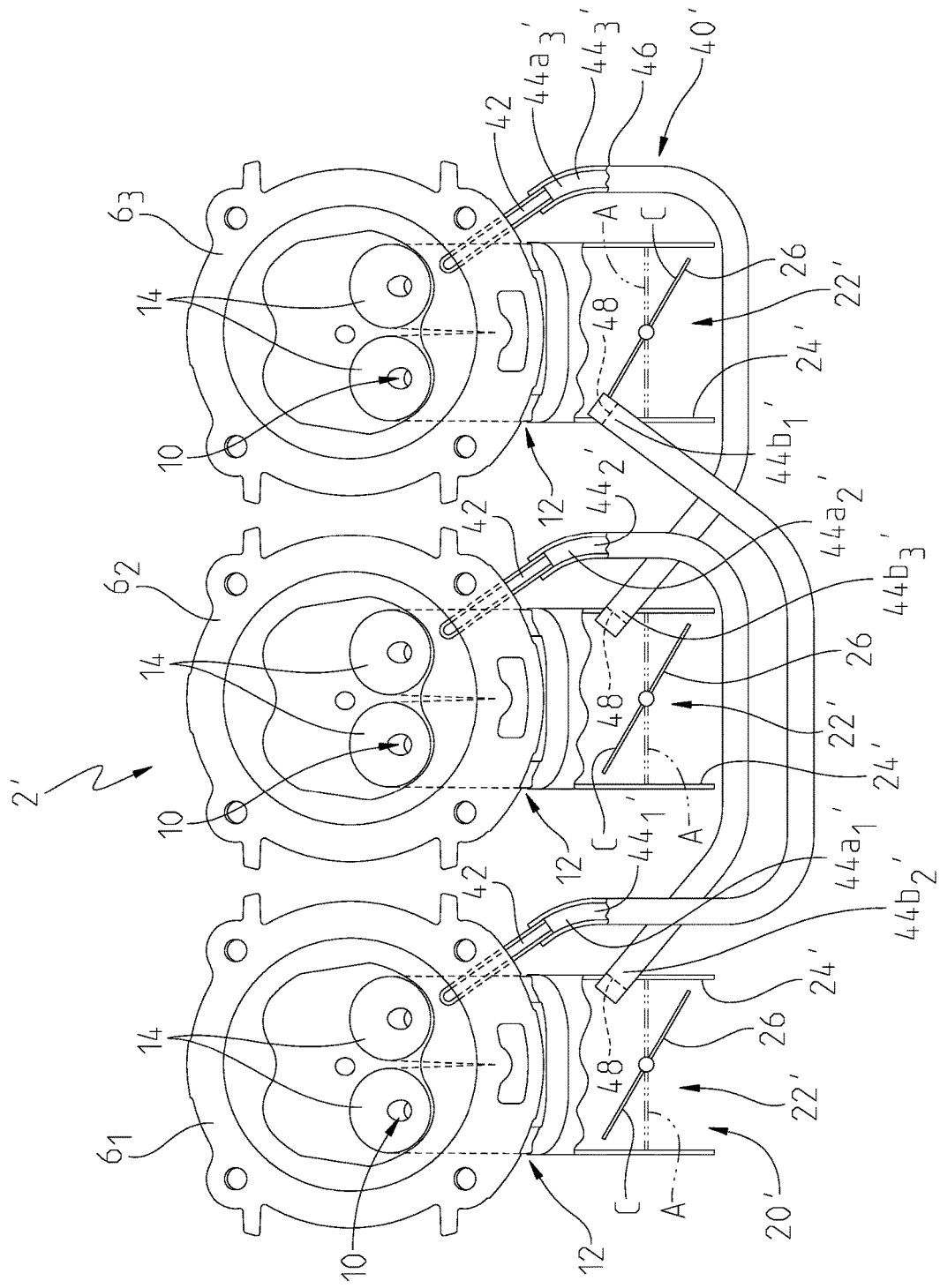
FIG. 7 is a schematic view of three cylinders of an engine of the present disclosure including a second embodiment of a supplementary air assembly which includes a tube extending from a throttle valve of one cylinder to a supplementary air inlet of another cylinder.

Referring to FIG. 7, an illustrative engine 2' includes three cylinders $6_1$, $6_2$, $6_3$, however, engine 2' may include any number of cylinders. An alternative embodiment of throttle body assembly 20 is also shown as throttle body assembly 20' which is fluidly coupled to cylinders $6_1$, $6_2$, $6_3$. Throttle body assembly 20' includes a throttle valve 22' fluidly coupled to air inlet 12 of each cylinder $6_1$, $6_2$, $6_3$. Throttle valve 22' has a solid body portion 24' such that body portion 24' of throttle body assembly 20' does not include apertures 32.

Throttle body assembly 20' is fluidly coupled to a supplementary air assembly 40' which includes supplementary air inlet 42 fluidly coupled to intake port 14 and supplementary air tubes $44_1'$, $44_2'$, $44_3'$ corresponding to cylinders $6_1$, $6_2$, $6_3$, respectively. More particularly, supplementary air tube $44_1'$ has a first end $44a_1'$ coupled to supplementary air inlet 42 of cylinder $6_1$ and a second end $44b_1'$ which extends into body portion 24' of cylinder $6_3$ and is downstream of throttle plate 26. Additionally, supplementary air tube $44_2'$ has a first end $44a_2'$ coupled to supplementary air inlet 42 of cylinder $6_2$ and a second end $44b_2'$ which extends into body portion 24' of cylinder $6_1$ and is downstream of throttle plate 26. Supplementary air tube $44_3'$ has a first end $44a_3'$ coupled to supplementary air inlet 42 of cylinder $6_3$ and a second end $44b_3'$ which extends into body portion 24' of cylinder $6_2$ and is downstream of throttle plate 26. As such, cylinder $6_1$, $6_2$, $6_3$ are fluidly coupled to each other through supplementary air assembly 40'. In one embodiment, a one-way valve 48, such as a reed valve, is positioned within any of supplementary air tubes $44_1'$, $44_2'$, $44_3'$ to control the direction of air flow therein.

In operation, the combustion cycles of cylinders $6_1$, $6_2$, $6_3$ are out of phase with each other such that when one of cylinders $6_1$, $6_2$, $6_3$ is in one stroke of the combustion cycle (e.g., the power stroke), the other cylinders $6_1$, $6_2$, $6_3$ are in a different stroke (e.g., intake stroke, exhaust stroke, etc.). Because cylinders $6_1$, $6_2$, $6_3$ are out of phase with each other, there is a pressure difference between intake ports of cylinders $6_1$, $6_2$, $6_3$, which facilitates air flow between the intake ports of cylinders $6_1$, $6_2$, $6_3$ through supplementary air assembly 40'. For example, when pressure is high in the intake port of cylinder $6_1$, the pressure in the intake port of cylinder $6_2$ is low which facilitates air flow through supplementary air tube $44_2'$ and into supplementary air inlet 42 of the intake port of cylinder $6_2$. Additionally, when pressure is high in the intake port of cylinder $6_2$, pressure is low in the intake port of cylinder $6_3$ which facilitates air flow through supplementary air tube $44_3'$ and into supplementary air inlet 42 of cylinder $6_3$. Similarly, when pressure is high in the intake port of cylinder $6_3$, pressure is low in the intake port of cylinder $6_1$ which facilitates air flow through supplementary air tube $44_1'$ and into supplementary air inlet 42 of cylinder $6_1$. In this way, the embodiment of FIG. 7 does not require the use of air control valve 500 (FIG. 3) because operation of supplementary air assembly 40' is controlled and modulated by throttle body assembly 20' of engine 2'. As such, no additional valve or throttling mechanism is required and combustion occurs efficiently in combustion chambers 10 even when engine 2' is operating at low loads or at idle.

Figure 8:
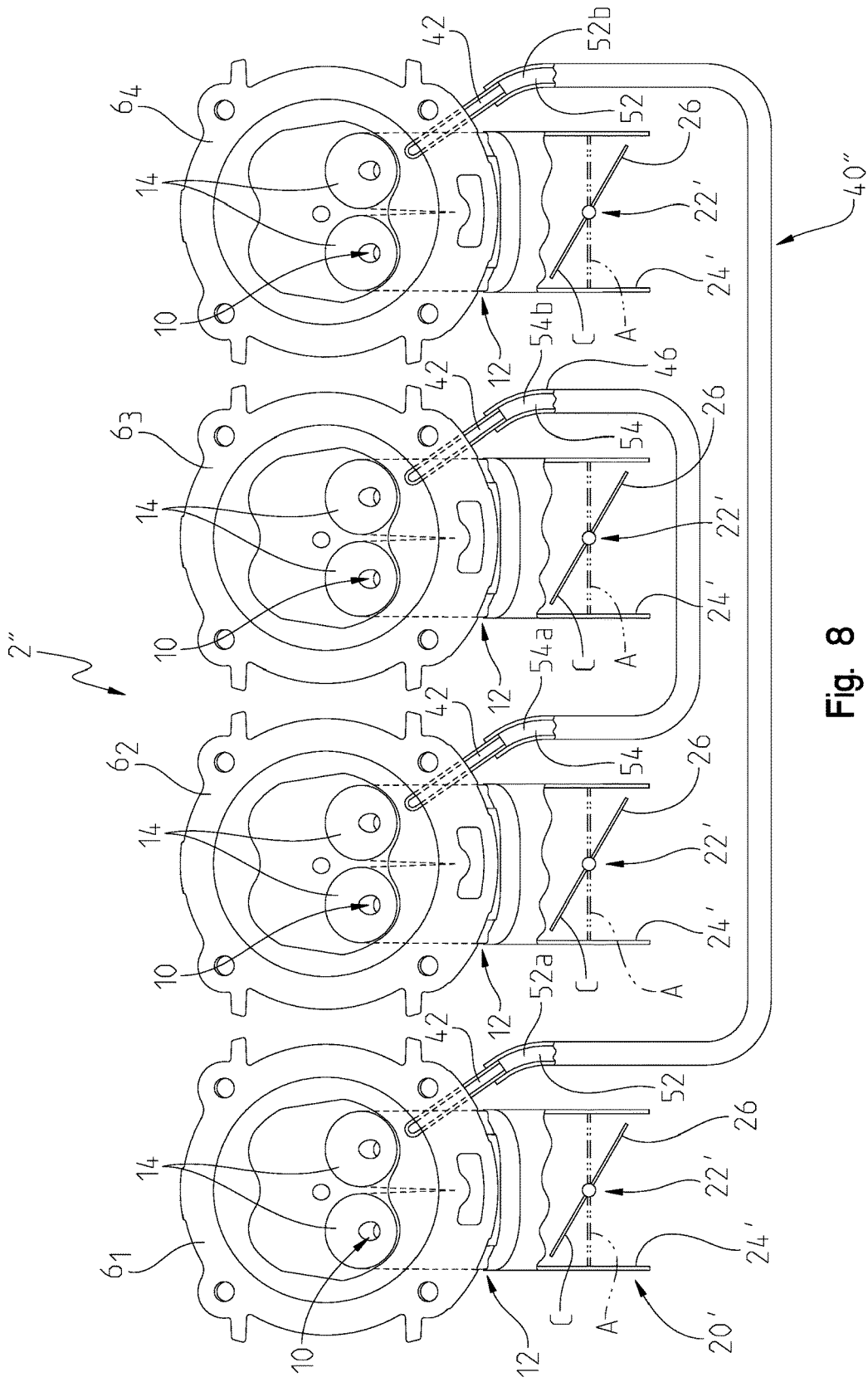
FIG. 8 is a schematic view of four cylinders of an engine of the present disclosure including a third embodiment of a supplementary air assembly which includes a tube extending from a supplementary air inlet of one cylinder to a supplementary air inlet of another cylinder.

Referring to FIG. 8, an illustrative engine 2' includes four cylinders $6_1$, $6_2$, $6_3$, $6_4$, but may include any number of cylinders. Throttle body assembly 20' is fluidly coupled to cylinders $6_1$, $6_2$, $6_3$, $6_4$. Throttle body assembly 20' includes throttle valve 22' with the solid body portion 24' such that body portion 24' of throttle body assembly 20' does not include apertures 32.

Referring still to FIG. 8, a further alternative embodiment of supplementary air assemblies 40 and 40' is shown as supplementary air assembly 40". Supplementary air assembly 40" is fluidly coupled to throttle body assembly 20'. Supplementary air assembly 40" includes a first supplementary air tube 52 which has a first end 52a fluidly coupled to supplementary air inlet 42 of cylinder $6_1$ and a second end fluidly coupled to supplementary air inlet 42 of cylinder $6_4$. Additionally, supplementary air assembly 40" includes a second supplementary air tube 54 which has a first end 54a fluidly coupled to supplementary air inlet 42 of cylinder $6_2$ and a second end 54b fluidly coupled to supplementary air inlet 42 of cylinder $6_3$.

In operation, the combustion cycles of cylinders $6_1$, $6_2$, $6_3$, $6_4$ are out of phase with each other such that when one of cylinders $6_1$, $6_2$, $6_3$, $6_4$ is in one stroke of the combustion cycle (e.g., the power stroke), the other cylinders $6_1$, $6_2$, $6_3$, $6_4$ are in a different stroke (e.g., intake stroke, exhaust stroke, etc.). Because cylinders $6_1$, $6_2$, $6_3$, $6_4$ are out of phase with each other, there is a pressure difference between the intake port of cylinders $6_1$, $6_2$, $6_3$, $6_4$, which facilitates air flow between the intake port of cylinders $6_1$, $6_2$, $6_3$, $6_4$ through supplementary air assembly 40". For example, when pressure is high in the intake port of cylinder $6_1$, the pressure in the intake port of cylinder $6_4$ is low which facilitates air flow through supplementary air tube 52 and into supplementary air inlet 42 of cylinder $6_4$. Similarly, when pressure is high in the intake port of cylinder $6_4$, pressure is low in the intake port of cylinder $6_1$ which facilitates air flow through supplementary air tube 52 in the opposite direction and into supplementary air inlet 42 of cylinder 6₁. Additionally, when pressure is high in the intake port of cylinder 6₃, pressure is low in the intake port of cylinder 6₂ which facilitates air flow through supplementary air tube 54 and into supplementary air inlet 42 of cylinder 6₂. Similarly, when pressure is high in the intake port of cylinder 6₂, pressure is low in the intake port of cylinder 6₃ which facilitates air flow through supplementary air tube 54 in the opposite direction and into supplementary air inlet 42 of cylinder 63. In this way, the embodiment of FIG. 8 does not require the use of air control valve 500 (FIG. 3) because operation of supplementary air assembly 40" is controlled and modulated by throttle body assembly 20' of engine 2". As such, no additional valve or throttling mechanism is required and combustion occurs efficiently in combustion chambers 10 even when engine 2" is operating at low loads or at idle.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An internal combustion engine comprising:
  a crankcase including a crankshaft;
  at least one cylinder coupled to the crankcase and defining an internal combustion chamber;
  an air intake system comprising an air inlet and an intake port of the at least one cylinder;
  a throttle body assembly having a throttle valve coupled to the air inlet and including a throttle plate;
  a supplementary air inlet fluidly coupled to the intake port, and configured to receive a flow of air from the air intake system from a location downstream of the throttle plate of the at least one cylinder, and the flow of air is directed into the intake port of the at least one cylinder for combustion within the combustion chamber and the flow of air is controlled and modulated by the position of the throttle plate;
  wherein the throttle body having a plurality of apertures extending through a wall of the throttle body, wherein at least a portion of the plurality of apertures are positioned downstream from the throttle plate when the throttle plate is in the fully closed position, and wherein a portion of the apertures are configured to receive air when the throttle plate is in a first position and each of the apertures receives air when the throttle plate is in a second position.

2. The engine of claim 1, wherein the flow of air is received through a supplementary air tube having first and second ends.

3. The engine of claim 2, wherein the first end of the supplementary air tube is positioned to direct air flow into the intake port and a second end is positioned adjacent to the throttle valve.

4. The engine of claim 3, wherein the supplementary air tube is positioned on a single cylinder.

5. The engine of claim 1, wherein at least a portion of the plurality of apertures are positioned upstream from the throttle plate when the throttle plate is in the fully closed position.

6. The engine of claim 1, wherein the at least one cylinder includes a plurality of cylinders, and a first supplementary air tube extends between a supplementary air inlet of one of the cylinders and an air inlet of another cylinder, and a second supplementary air tube extends between a supplementary air inlet of one of the cylinders and an air inlet of another cylinder.

7. The engine of claim 6, further comprising a third supplementary air tube which extends between a supplementary air inlet of one of the cylinders and an air inlet of another cylinder.

8. The engine of claim 1, further comprising a one-way valve positioned for directional flow of air.

9. The engine of claim 1, wherein operation of the throttle body assembly is electronically controlled by an engine control unit.

10. The engine of claim 1, wherein the at least one cylinder includes a plurality of cylinders, and a first end of a first supplementary air tube is fluidly coupled to a supplementary air inlet of one cylinder and a second end of the first supplementary air tube is fluidly coupled to a supplementary air inlet of another cylinder.

11. The engine of claim 10, wherein the first and second ends of the first supplementary air tube are positioned in respective intake ports of the two cylinders.

12. The engine of claim 11, wherein the engine is a V-twin configuration.

13. The engine of claim 11, wherein the at least one cylinder further includes at least a third cylinder and a fourth cylinder, and a first end of a second supplementary air tube is fluidly coupled to a supplementary air inlet of the third cylinder and a second end of the second supplementary air tube is fluidly coupled to a supplementary air inlet of the fourth cylinder.

14. The engine of claim 13, wherein the first and second ends of the second supplementary air tube are positioned in respective intake ports of the third and fourth cylinders.

15. The engine of claim 14, wherein a length of the second supplementary air tube is greater than a length of the first supplementary air tube.

16. An internal combustion engine, comprising:
  a crankcase including a crankshaft;
  at least one cylinder coupled to the crankcase and having an intake port and the at least one cylinder defining an internal combustion chamber;
  a throttle body assembly having a throttle valve coupled to an air inlet of the at least one cylinder and including a throttle plate;
  a supplementary air inlet fluidly coupled to the intake port, wherein the supplementary air inlet is configured to receive a flow of air from a location downstream of the throttle plate of the at least one cylinder, and the flow of air is directed into the intake port of the at least one cylinder for combustion within the combustion chambers
  wherein the throttle body includes a plurality of apertures extending through a wall of the throttle body and open into the air inlet adjacent to the throttle plate, and wherein at least a portion of the plurality of apertures are positioned downstream from the throttle plate when the throttle plate is in the fully closed position, and wherein a portion of the apertures are configured to receive air when the throttle plate is in a first position and each of the apertures receives air when the throttle plate is in a second position.

17. The engine of claim 16, wherein the flow of air is received through a supplementary air tube having first and second ends.

18. The engine of claim 17, wherein the first end of the supplementary air tube is positioned to direct air flow into the intake port and a second end is positioned adjacent to the throttle valve.

19. The engine of claim 18, wherein the first and second ends of the first supplementary air tube are positioned in respective intake ports of the two cylinders.

20. The engine of claim 19, wherein the engine is a V-twin configuration.

21. The engine of claim 17, wherein the supplementary air tube is positioned on a single cylinder.

22. The engine of claim 16, wherein the flow of air received within the supplementary air inlet is controlled by movement of the throttle plate.

23. The engine of claim 16, wherein operation of the throttle body assembly is electronically controlled by an engine control unit.

24. The engine of claim 16, wherein the at least one cylinder includes a plurality of cylinders and a first supplementary air tube extends between a supplementary air inlet of one of the cylinders and an air inlet of another cylinder, and a second supplementary air tube extends between a supplementary air inlet of one of the cylinders and an air inlet of another cylinder.

25. The engine of claim 24, further comprising a third supplementary air tube which extends between a supplementary air inlet of one of the cylinders and an air inlet of another cylinder.

26. The engine of claim 16, further comprising a one-way valve positioned for directional flow of air.

27. The engine of claim 16, wherein the at least one cylinder includes a plurality of cylinders, and a first end of a first supplementary air tube is fluidly coupled to a supplementary air inlet of one cylinder and a second end of the first supplementary air tube is fluidly coupled to a supplementary air inlet of another cylinder.

28. The engine of claim 16, wherein the at least one cylinder further includes at least a third cylinder and a fourth cylinder, and a first end of a second supplementary air tube is fluidly coupled to a supplementary air inlet of the third cylinder and a second end of the second supplementary air tube is fluidly coupled to a supplementary air inlet of the fourth cylinder.

29. The engine of claim 28, wherein a length of the second supplementary air tube is greater than a length of the first supplementary air tube.

30. The engine of claim 28, wherein the first and second ends of the second supplementary air tube are positioned in respective intake ports of the third and fourth cylinders.

31. An internal combustion engine, comprising:
a crankcase including a crankshaft
at least one cylinder coupled to the crankcase and having an intake port and the at least one cylinder defining an internal combustion chamber;
a throttle body assembly having a throttle valve coupled to an air inlet of the at least one cylinder and including a throttle plate;
a supplementary air inlet fluidly coupled to the intake port, wherein the supplementary air inlet is configured to receive a flow of air from a location downstream of the throttle plate of the at least one cylinder, and the flow of air is directed into the intake port of the at least one cylinder for combustion within the combustion chamber;
wherein the throttle body includes a plurality of apertures extending through a wall of the throttle body and open into the air inlet adjacent to the throttle plate, and
wherein at least a portion of the plurality of apertures are positioned upstream from the throttle plate when the throttle plate is in the fully closed position.

* * * * *